No. 625,629.  Patented May 23, 1899.
B. F. WYATT.
SHOVEL FOR LAYING TILE.
(Application filed Aug. 2, 1898.)

(No Model.)

WITNESSES:
C. R. Johnson
B. L. Bauder

INVENTOR
B. F. Wyatt
BY S. E. Bauder
ATTORNEY.

UNITED STATES PATENT OFFICE.

BENJAMIN F. WYATT, OF NORWALK, OHIO.

SHOVEL FOR LAYING TILE.

SPECIFICATION forming part of Letters Patent No. 625,629, dated May 23, 1899.

Application filed August 2, 1898. Serial No. 687,502. (No model.)

*To all whom it may concern:*

Be it known that I, BENJAMIN F. WYATT, a citizen of the United States, residing at Norwalk, in the county of Huron and State of Ohio, have invented certain new and useful Improvements in Shovels for Laying Tile; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a shovel for laying tile; and it consists in a crooked or inclined handle to which is secured a head or body member having a contracted cylindrical vessel portion preceded by a wider scoop portion having a curved bottom and a horizontally-disposed foot-piece at the junction of the handle and body member and constructed so that the device may be used either as a shovel for digging a narrow ditch or trench and for throwing mud and water therefrom or as a tool for quickly smoothing, treating, or suitably inclining the bottom of the ditch, whereby the tile may be coincidingly laid at the desired inclination for proper drainage, all of which I will more fully describe hereinafter.

Figure 1:
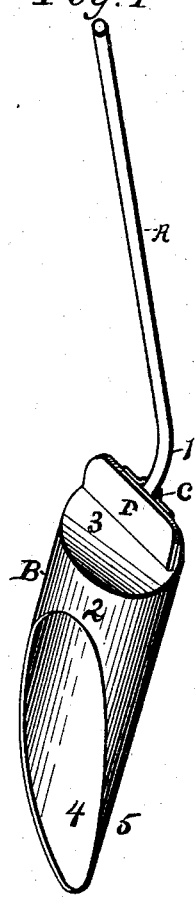
Figure 2:
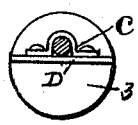

In the accompanying drawings, Figure 1 is a view in perspective of my improved shovel for laying tile. Fig. 2 is a back or end view of the device as it appears with the handle removed.

Similar letters and figures of reference when they occur indicate corresponding parts in both views.

Referring to the drawings, A represents the handle, which is provided with a bend 1.

B refers in a general way to the body or head member, which may be more particularly described as comprising in its construction a contracted cylindrical vessel portion 2, having a circular inclosed end 3 and preceded by a scoop portion 4 integral therewith and having a curved bottom 5, the said scoop portion 4 being slightly wider than the vessel portion 2, whereby the device may be more easily manipulated, as is plain.

The handle A is secured to the body B by means of a socket C in the usual manner. Resting on the socket C and preferably horizontally across the end 3 of the body B is a foot-piece D, on which either foot of the user may be placed to thrust the device "shovel-like" into the soil to be dug. The parts, it is evident, may be held in place by means of rivets or equivalent devices in the usual manner.

That my improved shovel herein set forth is adapted for digging a narrow ditch, throwing water therefrom, and for smoothing and inclining the bottom thereof is obvious.

I do not wish to be understood as confining myself to the exact construction herein shown, as the device may be changed in a number of ways without departing from the spirit and purpose of my invention.

Having thus described my invention, what I claim, and desire to secure by Letters Patent, is—

1. A shovel consisting of a tubular body inclosed at the upper end, which body is larger at its open end, and is provided with a scoop portion; a handle A having a bend 1 attached to the end wall of the body; a foot-piece D secured across the inclosed end of the body at right angles thereto and bearing against the handle, and a socket-plate C, secured to the foot-piece and extending around the end of the handle, substantially as shown and described.

2. A shovel for laying tile, comprising a handle having bend 1, a body member B having a narrow vessel portion 2 with circular end 3, a wider scoop portion 4 having a curved bottom 5, a socket C and a foot-piece D; all substantially as described and for the purpose named.

In testimony whereof I affix my signature in presence of two witnesses.

BENJAMIN F. WYATT.

Witnesses:
T. M. EDSALL,
S. T. A. VAN SCIVER.